A. E. DOMAN.
METHOD OF MAKING COMMUTATOR SEGMENTS.
APPLICATION FILED DEC. 18, 1918.
1,314,051.                                      Patented Aug. 26, 1919.
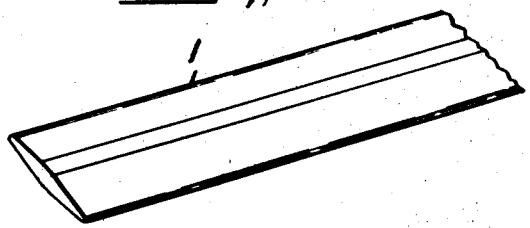
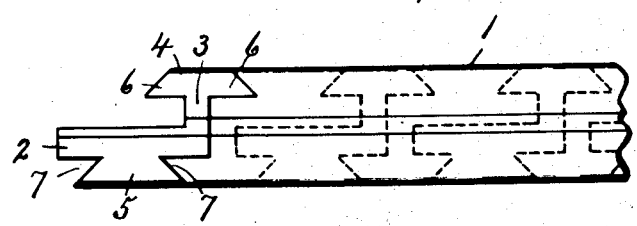
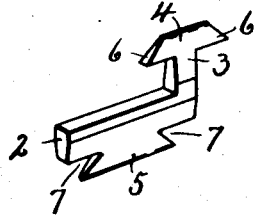
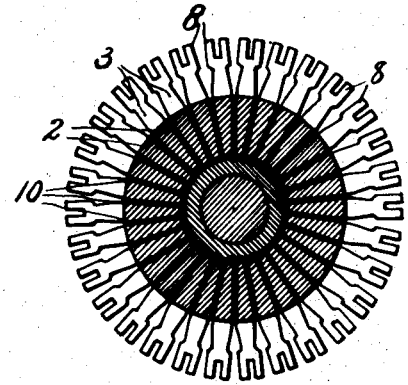
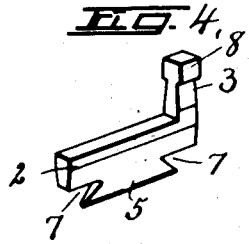
INVENTOR
A. E. Doman
BY
Howard P. Denison
ATTORNEY

UNITED STATES PATENT OFFICE.

ALBERT E. DOMAN, OF SYRACUSE, NEW YORK.

METHOD OF MAKING COMMUTATOR-SEGMENTS.

1,314,051.  Specification of Letters Patent.  Patented Aug. 26, 1919.

Application filed December 18, 1918. Serial No. 267,366.

*To all whom it may concern:*

Be it known that I, ALBERT E. DOMAN, a citizen of the United States of America, and resident of Syracuse, in the county of Onondaga, in the State of New York, have invented new and useful Improvements in Methods of Making Commutator-Segments, of which the following, taken in connection with the accompanying drawings, is a full, clear, and exact description.

This invention relates to an improved method of making commutator segments from bars or blanks similar to that set forth in my Patents Nos. 1,282,051 and 1,282,052, Oct. 22, 1918, but differs therefrom in that the tangs are formed with dovetail heads, the wings of which are counterparts of the recesses at opposite ends of the dovetail head on the inner edge of the segment.

The object is to avoid any waste except in the first and last cuts from each bar and to utilize said wings by compression toward each other for building up and reinforcing the portions of the tangs to which the armature wires are to be attached.

Other objects and uses will be brought out in the following description.

In the drawings:—

Figure —1— is a perspective view of a portion of a bar or blank from which the segments are to be cut.

Fig. —2— is a plan of the same bar showing the method of cutting the segments therefrom.

Fig. —3— is a perspective view of one of the segments as cut from the bar.

Fig. —4— is a perspective view of the same segment after the wings of the tang have been compressed.

Fig. —5— is a transverse sectional view of a commutator embodying the segments formed by the herein described method, the enlarged ends of the tangs being shown as slotted to receive the armature wires.

In carrying out the objects stated, a copper bar —1— of any desired length greater than that of two or more segments is given the desired cross sectional form by rolling or other suitable process so that its width from end to end will be the same as that of the required segment and its opposite lengthwise halves or edges wedge-shape and of the same angle to correspond to the number of segments used to form the cylindrical portion of a commutator of known diameter.

This bar is then progressively cut into segment lengths —2— so as to form a tang —3— and a dovetail head —4— at the inner end of the outer side, and an additional dovetail head —5— near the center of the inner side, the wings, as —6—, of the outer head —4— being counterparts of the recesses, as —7—, at opposite ends of the inner head —5— so as to avoid any waste of the bar stock except that resulting from the first and last cuts of the bar.

After the segments shown in Fig. —3— are cut from the bar —1— the wings —6— are compressed toward each other into approximately the form shown at —8—, Fig. —4— for the purpose of enlarging and reinforcing the portions of the tangs to which the armature wires are to be attached and, if desired, these reinforced portions may be bifurcated longitudinally as shown in Fig. —5—, to receive said wires and permit the latter to be firmly fastened to their segments by simply compressing the opposite tines of the tangs thereon, or by soldering.

After the segments are formed in the manner shown in Figs. —3— and —4—, they may be assembled circumferentially about the commutator shaft so as to alternate with the insulator segments —10—, as shown in Fig. —5—, it being understood that the commutator frame is provided with suitable means for interlocking engagement with the dovetailed inner heads —5— to hold the segments in their assembled relation.

What I claim is:

1. The herein described method of making a commutator segment consisting in forming winged-heads on both edges of the segment and then compressing the wings of the outer head toward each other.

2. The herein described method of making commutator segments consisting in forming a bar of the same width as that of the required segment with opposite wedge shape edges of the same angle, and then cutting the bar into segment lengths so as to form winged heads on both edges of each segment in which the wings of one head are the counterparts of the recesses at the ends of the other head to avoid waste.

3. The herein described method of making commutator segments consisting in forming a bar of the same width as that of the required segment with opposite wedge shape edges of the same angle, and then cutting the bar into segment lengths so as to form winged heads on both edges of each segment in which the wings of one head are the counterparts of the recesses at the ends of the other head to avoid waste and finally compressing the wings of one of the heads.

4. The herein described method of making a commutator segment consisting in forming a tang on the segment with a wing and then compressing the wing to enlarge the adjacent portions of the tang to receive an armature wire.

5. The herein described method of making a commutator segment consisting in forming a tang on the segment with a wing, then compressing the wing to enlarge the adjacent portion of the segment and finally slotting the enlarged portion of the tang to receive an armature wire.

In witness whereof I have hereunto set my hand this 11th day of December 1918.

ALBERT E. DOMAN.

Witnesses:
H. E. CHASE,
ETHEL M. WILLIAMS.